(12) United States Patent
Okamoto

(10) Patent No.: US 11,306,610 B2
(45) Date of Patent: Apr. 19, 2022

(54) TURBINE HOUSING AND WASHING METHOD OF TURBINE HOUSING

(71) Applicant: Marelli Corporation, Saitama (JP)

(72) Inventor: Hiroyuki Okamoto, Saitama (JP)

(73) Assignee: Marelli Corporation, Saitama (JP)

( * ) Notice: Subject to any disclaimer, the term of this patent is extended or adjusted under 35 U.S.C. 154(b) by 190 days.

(21) Appl. No.: 16/955,535

(22) PCT Filed: Nov. 15, 2018

(86) PCT No.: PCT/JP2018/042238
§ 371 (c)(1),
(2) Date: Jun. 18, 2020

(87) PCT Pub. No.: WO2019/123908
PCT Pub. Date: Jun. 27, 2019

(65) Prior Publication Data
US 2021/0010390 A1    Jan. 14, 2021

(30) Foreign Application Priority Data

Dec. 22, 2017   (JP) .............................. JP2017-245804

(51) Int. Cl.
*F01D 25/00* (2006.01)
*B08B 9/032* (2006.01)
*F01D 25/24* (2006.01)

(52) U.S. Cl.
CPC .......... *F01D 25/002* (2013.01); *B08B 9/0321* (2013.01); *F01D 25/24* (2013.01)

(58) Field of Classification Search
CPC ........ F01D 25/002; F01D 25/24; F01D 25/30; F01D 25/32; F01D 25/26; B08B 9/0321; F02C 6/12; F02B 39/16; F02B 39/00; F05D 2230/54
USPC ..................................... 415/121.2, 204, 205
See application file for complete search history.

(56) References Cited

U.S. PATENT DOCUMENTS

| | | | | |
|---|---|---|---|---|
| 5,944,483 A | * | 8/1999 | Beck ..................... | F01D 25/002 415/117 |
| 11,015,612 B2 | * | 5/2021 | Iijima ..................... | F01D 25/26 |
| 2009/0133718 A1 | * | 5/2009 | Lebold ..................... | B08B 9/00 415/13 |
| 2011/0008151 A1 | * | 1/2011 | Heyes ..................... | F02B 39/16 415/121.3 |
| 2012/0023928 A1 | * | 2/2012 | Smatloch ................ | F02B 67/10 60/598 |

FOREIGN PATENT DOCUMENTS

| | | |
|---|---|---|
| JP | S59-119929 U | 8/1984 |
| JP | 2017-89450 A | 5/2017 |

* cited by examiner

*Primary Examiner* — Hoang M Nguyen
(74) *Attorney, Agent, or Firm* — Young Basile Hanlon & MacFarlane, P.C.

(57) ABSTRACT

A turbine housing is provided with an inner pipe forming a spiral-shaped exhaust gas flow path, an exhaust-air-inlet-side flange serving as an exhaust gas inlet to the inner pipe, and an outer pipe that, together with the exhaust-air-inlet-side flange, covers and seals the inner pipe. The outer pipe has an opening through which the washing fluid can pass through and a closing member that closes the opening, and a space through which the washing fluid can pass through is formed between the inner pipe and the exhaust-air-inlet-side flange.

6 Claims, 13 Drawing Sheets

TURBINE HOUSING AND WASHING METHOD OF TURBINE HOUSING

CROSS-REFERENCE TO RELATED APPLICATION(S)

This application is a national stage 371 application of PCT/JP2018/042238, filed on Nov. 15, 2018, which claims priority to Japan Application Patent Serial No. 2017-245804, filed Dec. 22, 2017, the entire disclosures of which are hereby incorporated by reference.

TECHNICAL FIELD

The present invention relates to a turbine housing used for a turbocharger (turbo-supercharger) of a vehicle and to a washing method of the turbine housing.

BACKGROUND

As a turbine housing used for a turbocharger, that made of a cast metal is generally used. In contrast, Japanese Unexamined Patent Application Publication No. 2017-89450 proposes, for example, a turbine housing that is fabricated by press molded parts of steel plates. This turbine housing is provided with a scroll portion that forms a spiral (spiral shaped) exhaust gas flow path between an exhaust-air-inlet-side flange forming an exhaust gas inlet and an exhaust-air-outlet-side flange forming an exhaust gas outlet. In this turbine housing, the scroll portion is formed of an inner pipe, and this inner pipe is covered by an outer pipe such that a space is formed therebetween. In the above, the inner pipe is formed of two sheet-metal-made inner-pipe divided bodies that have been divided and a cast-metal-made inner-pipe divided body that is positioned at a regional part facing a turbine wheel provided at the center of the scroll portion, and the outer pipe is formed of two sheet-metal-made outer pipe divided bodies that have been divided. By having such a configuration, the turbine housing has a double-shell (double pipe) structure having the space between the outer pipe and the inner pipe, which is formed such that exhaust gas is discharged to the exhaust air outlet side via the turbine wheel.

SUMMARY

In a turbine housing, although it is necessary to suppress trapping of extraneous matter in an interior of the turbine housing, because the space between the inner pipe and the outer pipe of the turbine housing is a closed space, if the extraneous matter enters between the inner pipe and the outer pipe, it is difficult to remove the extraneous matter.

Thus, an object of the present invention is to provide a turbine housing from which extraneous matters in an interior of a turbine housing can be removed by washing and to provide a washing method of the turbine housing.

A turbine housing according to the present invention includes: an inner pipe forming a spiral-shaped exhaust gas flow path; an exhaust-air-inlet-side flange forming an exhaust gas inlet to the inner pipe; and an outer pipe configured to, together with the exhaust-air-inlet-side flange, cover and seal the inner pipe, wherein the outer pipe has an opening and a closing member for closing the opening, the opening being configured such that the washing fluid can pass through, and a space is formed between the inner pipe and the exhaust-air-inlet-side flange, the space being configured such that the washing fluid can pass through.

A washing method of a turbine housing according to the present invention, the turbine housing being provided with a scroll portion forming a spiral-shaped exhaust gas flow path between an exhaust-air-inlet-side flange forming an exhaust gas inlet and an exhaust-air-outlet-side flange forming the exhaust gas outlet, the scroll portion being formed of an inner pipe, the inner pipe being at least formed of sheet-metal-made inner-pipe divided bodies divided into a plurality of parts, and the turbine housing having a double-shell structure with a space between the inner pipe and an outer pipe such that the exhaust gas is discharged via a turbine wheel to an exhaust air outlet side, the inner pipe being covered by the outer pipe formed of sheet-metal-made outer pipe divided bodies divided into a plurality of parts so as to form the space between the inner pipe and the outer pipe, wherein after the plurality of parts forming the turbine housing are assembled and subjected to processing, the washing fluid is supplied from one of a liquid supply/discharge port provided at a position facing the exhaust gas inlet of the outer pipe or the space provided between a lower end portion of the inner pipe on an exhaust-air-inlet side and the exhaust-air-inlet-side flange, and the washing fluid is allowed to flow out from other of the liquid supply/discharge port or the space together with extraneous matter generated during the processing.

According to the present invention, it is possible to provide a turbine housing from which extraneous matters in the interior of the turbine housing can be removed by washing and a washing method of the turbine housing.

DETAILED DESCRIPTION

Figure 1:
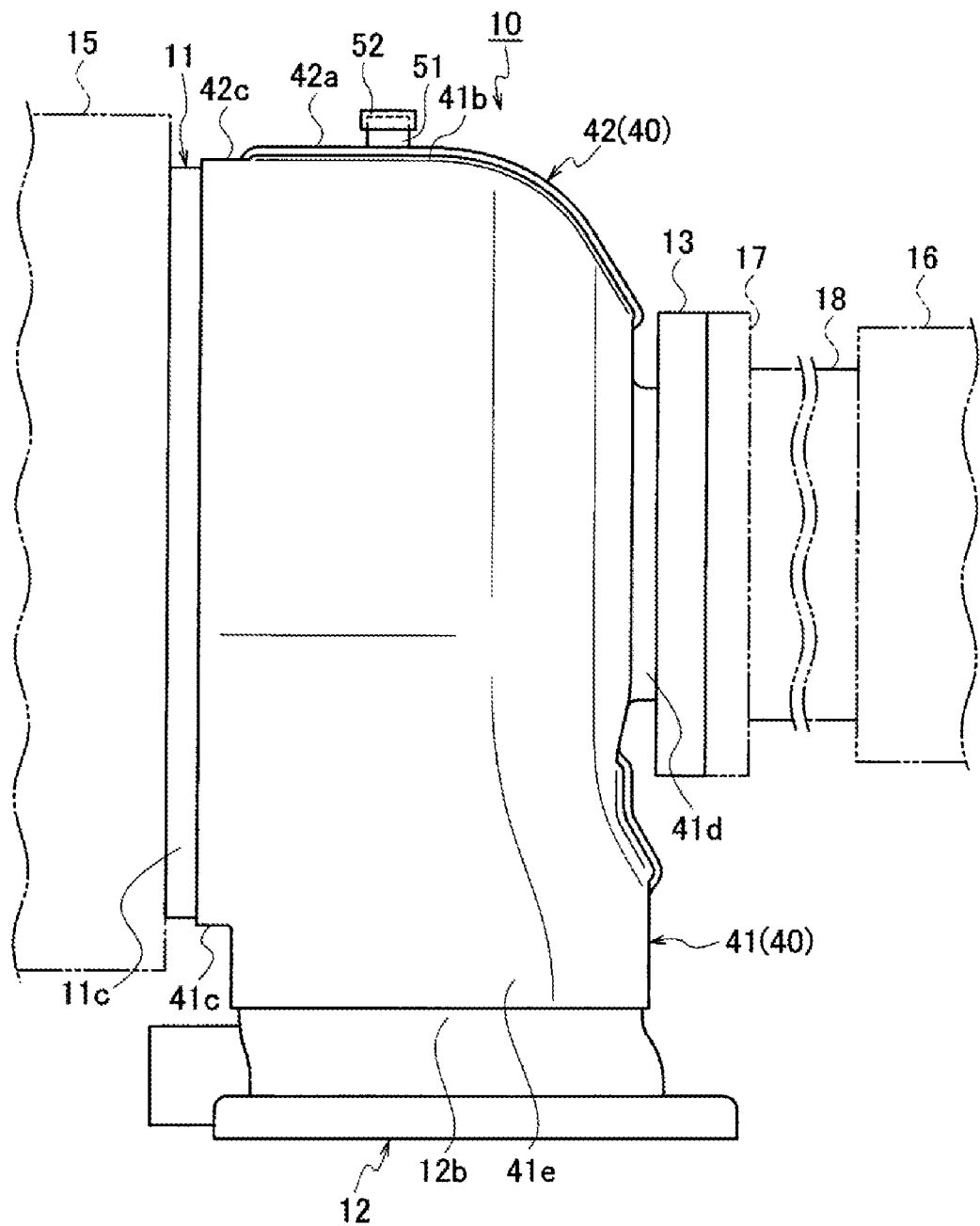
FIG. 1 is a side view of a turbine housing used for a turbocharger of a first embodiment of the present invention.

An embodiment of the present invention will be described below with reference to the drawings.

A turbine housing 10 of a first embodiment of the present invention will be first described with reference to FIGS. 1 to 8.

The turbine housing 10 shown in FIGS. 1 to 4 is used as a housing of a turbocharger (turbo-supercharger) of a vehicle. The turbine housing 10 has a double-shell (double pipe) structure formed of: an inner pipe 20 serving as a scroll portion that forms a spiral (spiral shaped) exhaust gas flow path K provided among a cast-metal-made center flange 11, an exhaust-air-inlet-side flange 12, which is made of a cast metal, forming an inlet 12a for exhaust gas B, and an exhaust-air-outlet-side flange 13 (the downstream side of exhaust air flow) forming an outlet 13a for the exhaust gas B; an exhaust tube 30 that is connected to a part of the inner pipe 20 (a cylinder shaped portion 23d) on the exhaust-air-outlet side; and an outer pipe 40 that covers both of the inner pipe 20 and the exhaust tube 30 such that a predetermined space G is formed therebetween. In the turbine housing 10, the exhaust gas B that has entered from the inlet 12a of the exhaust-air-inlet-side flange 12 is discharged from the outlet 13a of the exhaust-air-outlet-side flange 13 made of a cast metal via a turbine wheel 14 that is provided at the spiral center portion (center portion) O of the inner pipe 20.

As shown in FIG. 1, a compressor 15 is connected to the center flange 11. In addition, a catalytic converter (emission control device) 16 for removing toxic pollutants from the exhaust gas B is connected via a joint flange 17 and a joint tube 18 to the exhaust-air-outlet-side flange 13 through which the exhaust gas B is discharged. In other words, the turbine housing 10 is disposed between the compressor 15 provided on the intake air inlet side and the catalytic converter 16.

Figure 2:
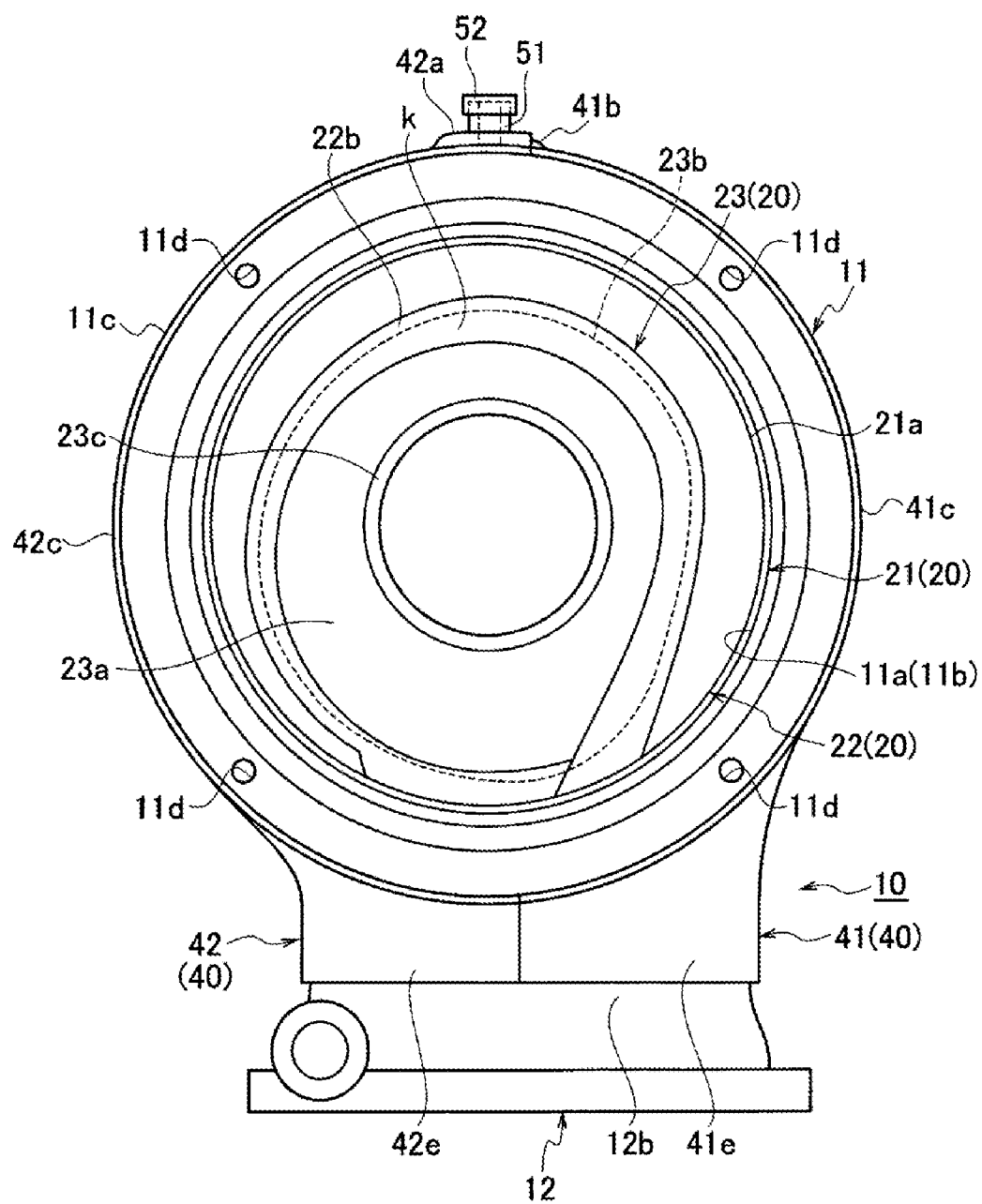
FIG. 2 is a front view of the turbine housing.
Figure 4:
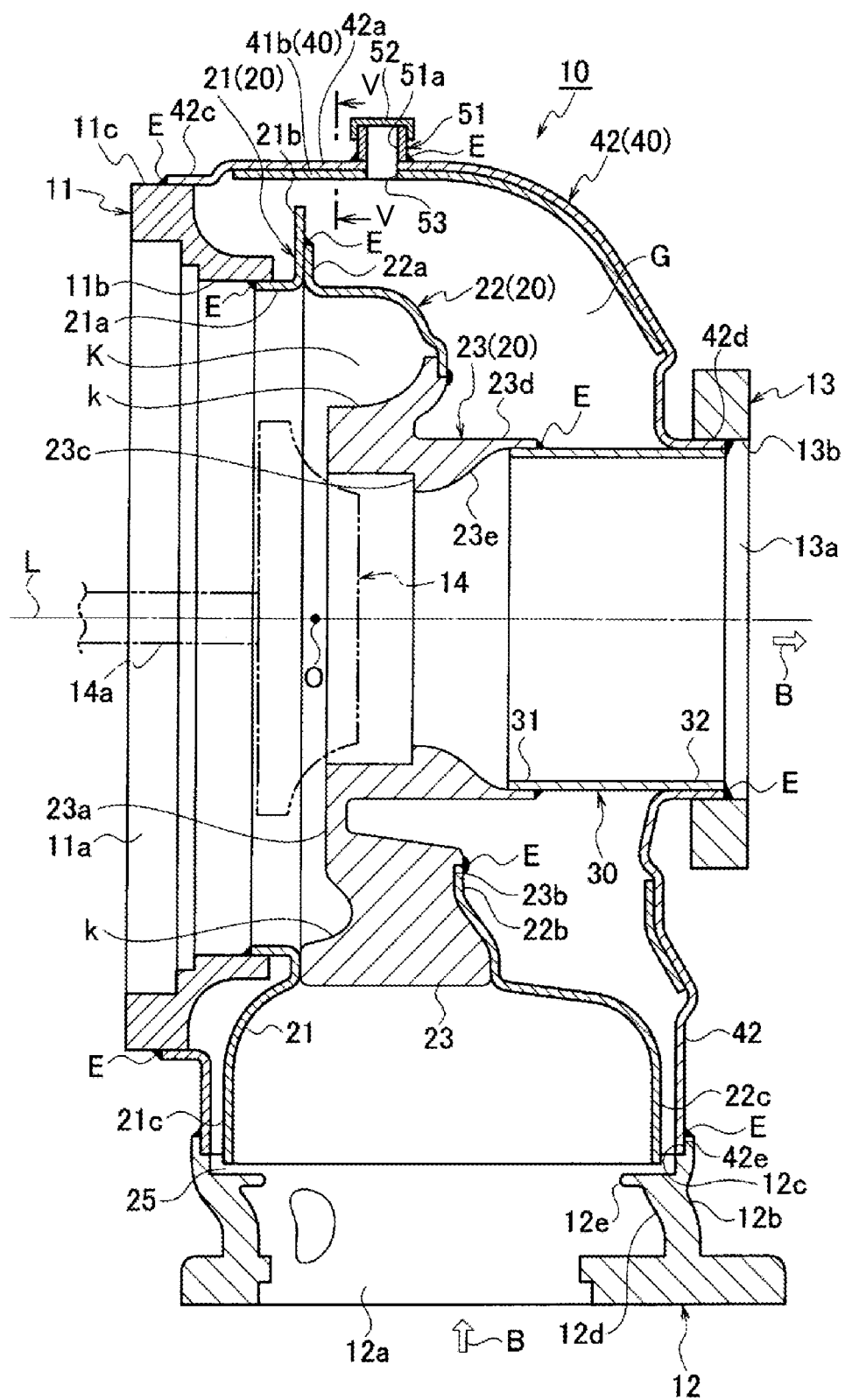
FIG. 4 is a sectional view of the turbine housing.

As shown in FIGS. 2 and 4, the inner pipe (the scroll portion) 20 essentially defines and forms the spiral-shaped exhaust gas flow path K for the exhaust gas B in the housing. In addition, the outer pipe 40 forms an outer-shell structure body that completely covers the inner pipe 20 and the exhaust tube 30 such that the predetermined space G is formed between the outer pipe 40 and both of the inner pipe 20 and the exhaust tube 30, that encloses the inner pipe 20 and the exhaust tube 30 so as to simultaneously provide protection and thermal insulation, and that achieves the purpose of increasing rigidity of the turbine housing 10 as a whole.

As shown in FIG. 4, the inner pipe 20 is formed of: a first inner-pipe divided body 21 and a second inner-pipe divided body 22 that are formed by being divided into two members along the direction orthogonal to the shaft direction L of a turbine shaft (driving shaft) 14a of the turbine wheel 14; and a third inner-pipe divided body 23 that is located at a regional part facing the turbine wheel 14 (a region on the side of the exhaust air outlet of the exhaust gas B). The first inner-pipe divided body 21 and the second inner-pipe divided body 22 are formed of thin plate-like shaped sheet-metal-made scroll members, and the third inner-pipe divided body 23 is formed of a scroll plate member made of the cast metal, which is formed by casting as a material having higher heat resistance than the material made of sheet metal.

As shown in FIGS. 2 and 4, the first inner-pipe divided body 21 and the second inner-pipe divided body 22 are molded into a predetermined curved tube shape by subjecting the sheet metal to press working. A rear-circumferential-edge-side end portion 21b and a front-circumferential-edge-side end portion 22a of two thus-press molded members made of sheet metal, i.e. the first inner-pipe divided body 21 and the second inner-pipe divided body 22, respectively, are jointed and fixed by being welded. In other words, the end portion 21b of the first inner-pipe divided body 21 on the rear circumferential edge side and the end portion 22a of the second inner-pipe divided body 22 on the front circumferential edge side are formed by being bent outward so as to respectively have different vertical lengths, and these end portions 21b and 22a having different lengths are mutually fixed by being welded (a welded portion is shown by a reference sign E).

In addition, as shown in FIGS. 2 and 4, the third inner-pipe divided body 23 is the cast metal part and is molded into the predetermined curved tube shape. As shown in FIG. 4, an end portion 22b of the sheet-metal-made second inner-pipe divided body 22 on the rear circumferential edge side is joined and fixed to an end portion 23b having a stepped-recessed shape of the cast-metal-made third inner-pipe divided body 23 on the rear outer circumference edge side by being welded on the reverse side surface of a flow path surface k of the exhaust gas flow path K (a welded portion is shown by the reference sign E). With such a configuration, the regional part of the inner pipe 20 facing the turbine wheel 14 as the region on the side of the exhaust air outlet of the exhaust gas B is formed of the cast-metal-made third inner-pipe divided body 23 that is made of the cast-metal-made scroll member. In addition, a remaining regional part of the inner pipe 20 is formed of the sheet-metal-made first inner-pipe divided body 21 and the sheet-metal-made second inner-pipe divided body 22 that are made of the sheet-metal-made scroll plate members, and the spiral-shaped exhaust gas flow path K is formed in the inner pipe 20.

Furthermore, as shown in FIGS. 2 and 4, a front surface 23a of the cast-metal-made third inner-pipe divided body 23 is formed to have a flat portion, and is formed such that the surface area of a lower part of the front surface 23a (the exhaust-air-inlet-side flange 12 side) is larger than the surface area of an upper part of the front surface 23a (the opposite side from the exhaust-air-inlet-side flange 12). In other words, as shown in FIG. 4, the cast-metal-made third inner-pipe divided body 23 is formed such that the regional part closer to the exhaust-air-inlet-side flange 12 has greater thickness than the regional part on the opposite side thereof. With such a configuration, a part of the flow path surface k of the exhaust gas flow path K in the inner pipe 20 is formed by the cast-metal-made third inner-pipe divided body 23.

Furthermore, a recessed portion 23c having a stepped-annular shape is formed on the exhaust-air-inlet side of the cast-metal-made third inner-pipe divided body 23, and the cylinder shaped portion (barrel shaped portion) 23d is integrally formed on the exhaust-air-outlet side of the third inner-pipe divided body 23 so as to project out therefrom. A reinforcing member (not shown) having an annular ring shape for protecting the turbine wheel 14 is fitted into the recessed portion 23c having the stepped-annular shape.

In addition, as shown in FIG. 4, an inner wall of the cylinder shaped portion 23d is formed to have an inclined surface 23e having a conical shape, the diameter of which increases toward the outlet side. A front-side end portion 31 of the exhaust tube 30 is fitted to the inclined surface 23e of the inner wall of the cylinder shaped portion 23d, and both are fixed by being welded (the welded portion is shown by the reference sign E).

As shown in FIGS. 1 to 4, the outer pipe 40 is formed of two sheet-metal-made thin plate members, i.e. a first outer-pipe divided body 41 and a second outer-pipe divided body 42, formed by halving the outer pipe 40 along the shaft direction L (the direction of vibration during the travel of the vehicle) of the turbine shaft 14a of the turbine wheel 14. The first outer pipe divided body 41 and the second outer pipe divided body 42 are molded into a predetermined curved shape by subjecting the sheet metal to the press working. Two thus-press molded members, i.e. the sheet-metal-made first outer pipe divided body 41 and the sheet-metal-made second outer pipe divided body 42, are joined by the welding, and thereby, the inner pipe 20 and the exhaust tube 30 are completely covered such that the predetermined space G is formed between the outer pipe 40 and both of the inner pipe 20 and the exhaust tube 30.

Figure 3:
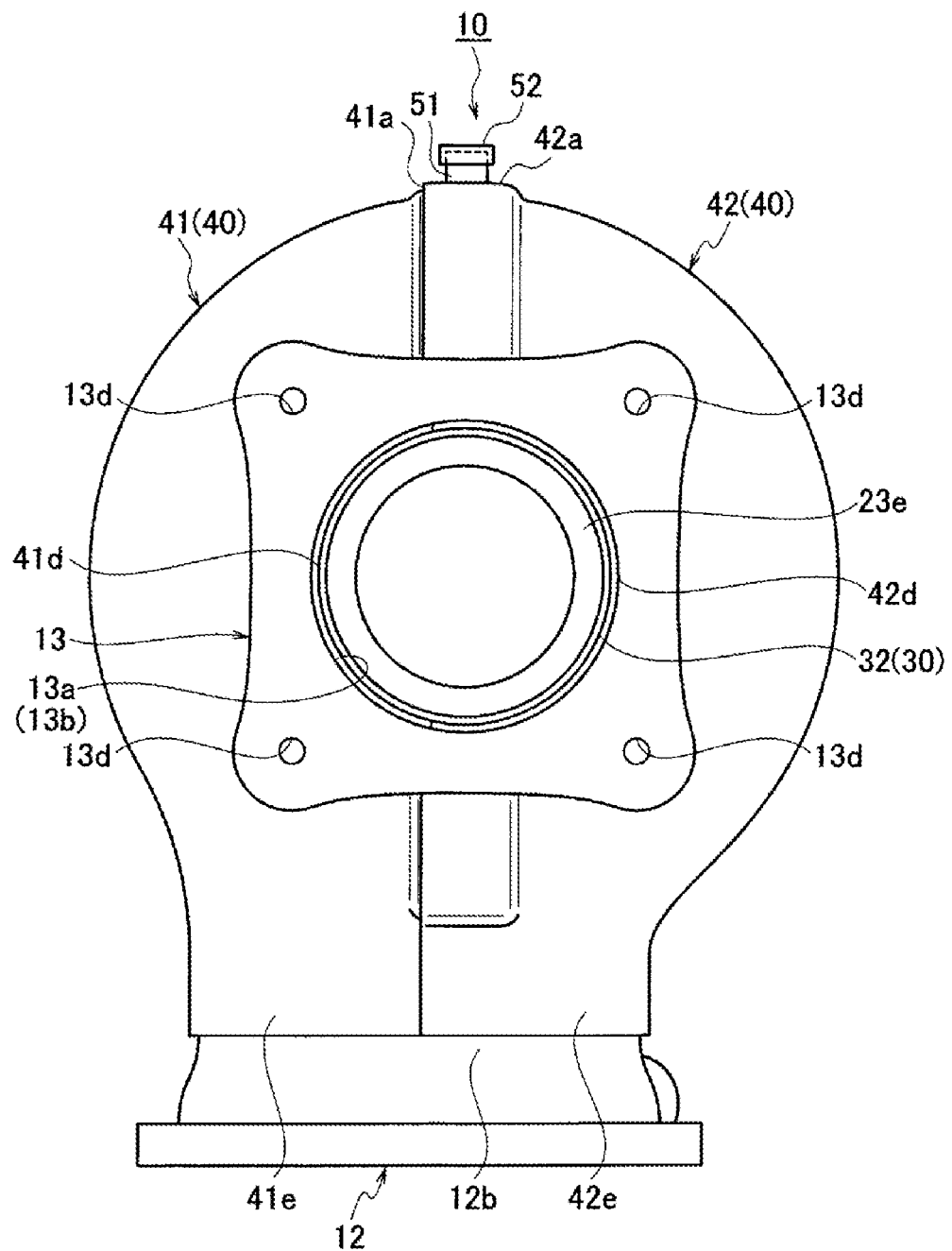
FIG. 3 is a rear view of the turbine housing.

In other words, as shown in FIGS. 1, 3, and 4, a second end portion 41b of the sheet-metal-made first outer pipe divided body 41 extending by forming a step and a first end portion 42a of the sheet-metal-made second outer pipe divided body 42 extending by forming a step are fixed to each other by overlaying the first end portion 42a on the second end portion 41b of the first outer pipe divided body 41 and by being welded (the welded portions are shown by the reference sign E) along the shaft direction (shaft line direction) L of the turbine shaft 14a of the turbine wheel 14. With such a configuration, because expansion and/or contraction is caused about the shaft direction L of the turbine shaft 14a during the travel of the vehicle, the welding is performed along the shaft direction L, and thereby, a fracture of the weld line is prevented.

Figure 5:
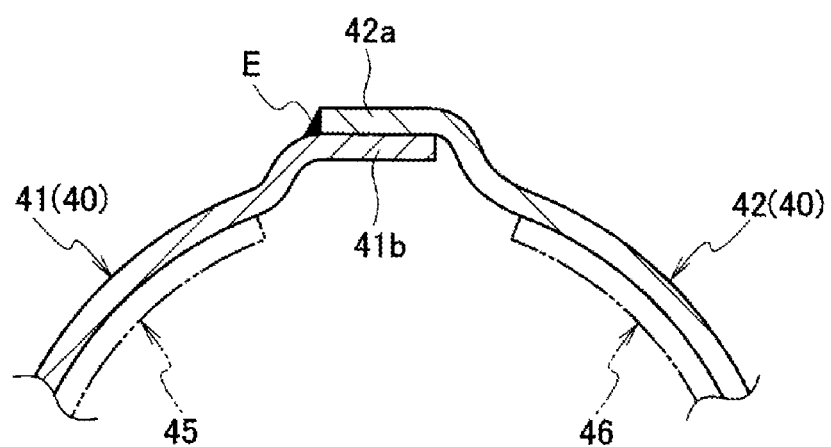
FIG. 5 is a sectional view taken along a line V-V in FIG. 4.
Figure 6:
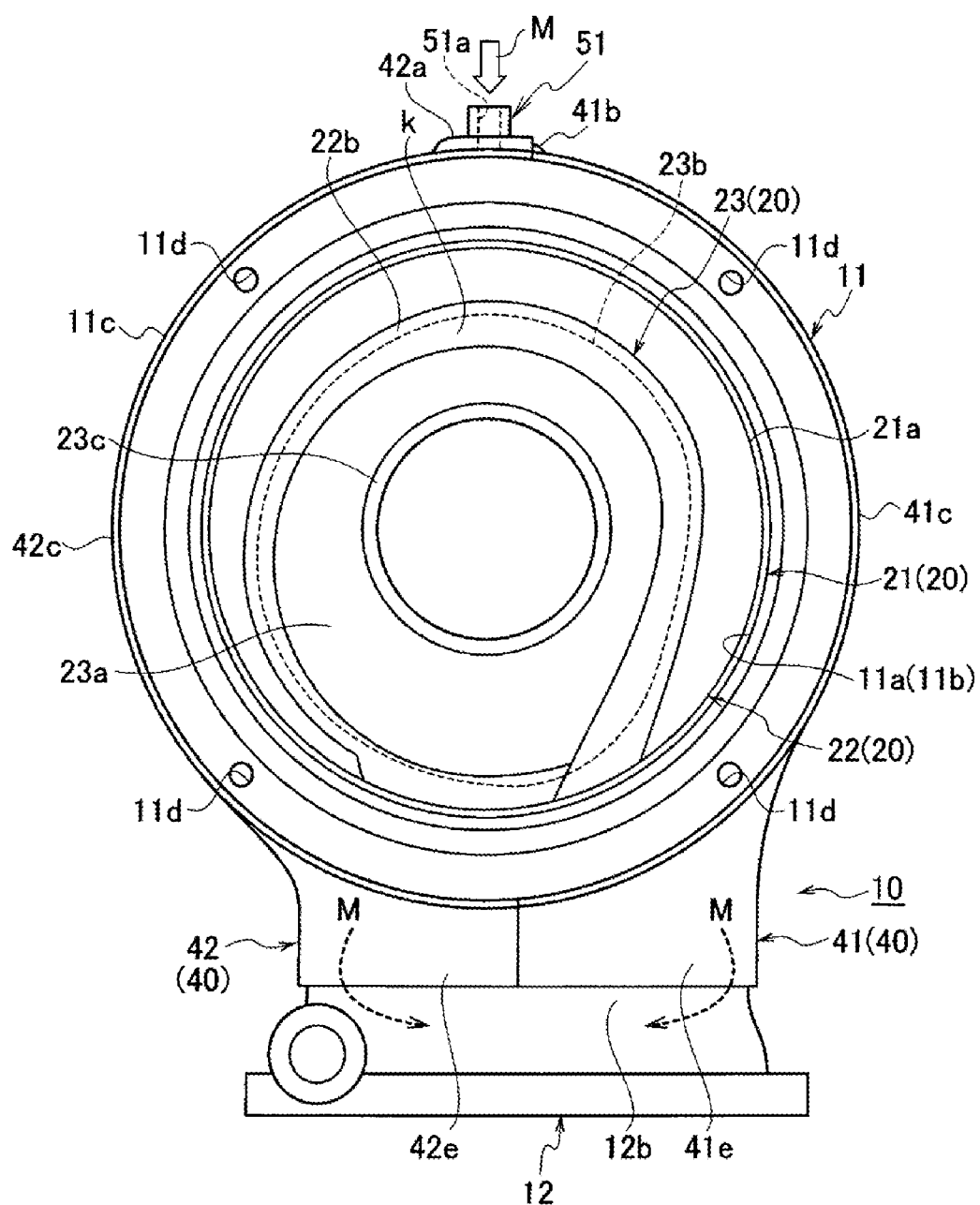
FIG. 6 is a front view showing a washing state of an interior of the turbine housing.
Figure 7:
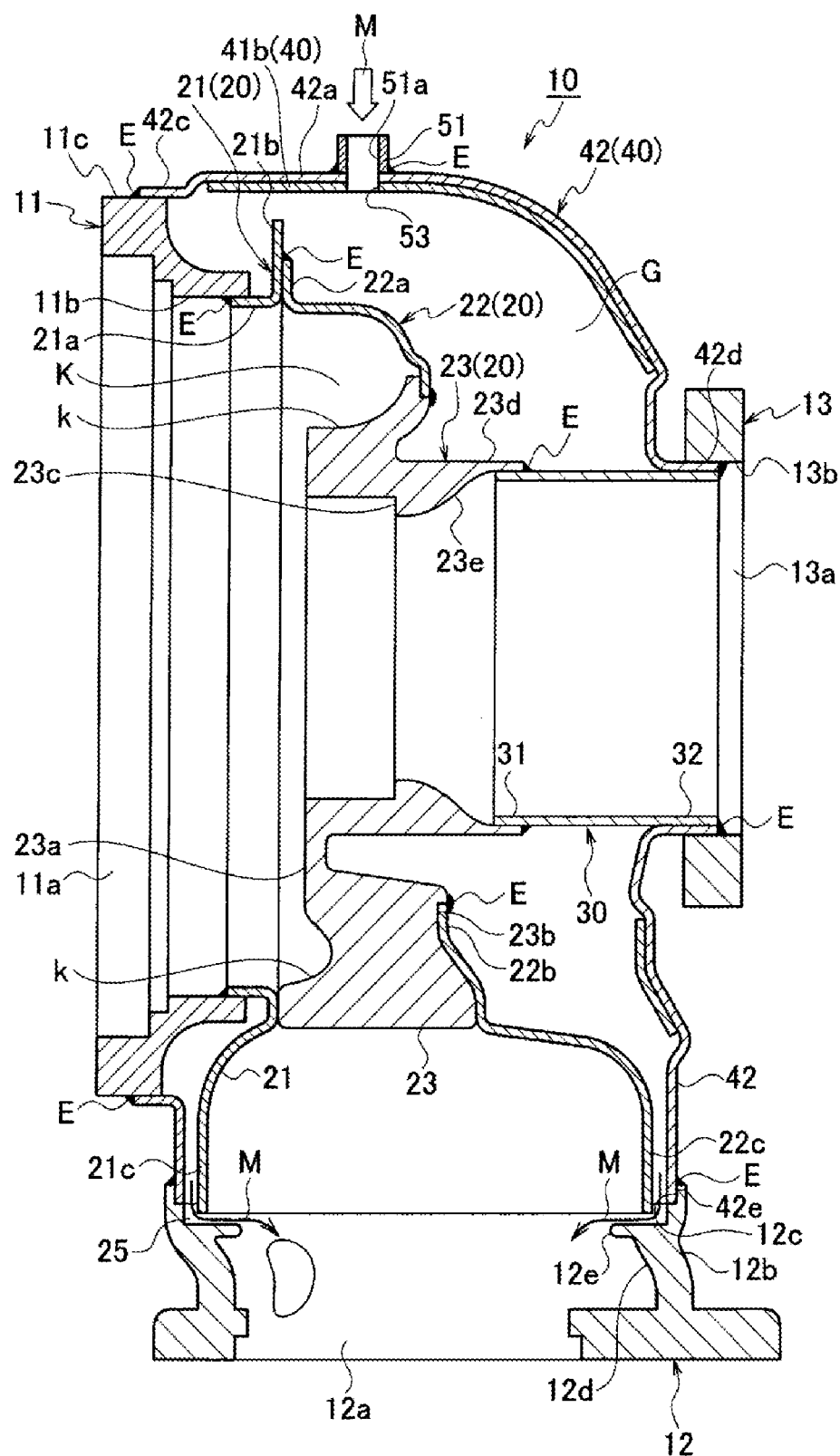
FIG. 7 is a sectional view showing the washing state of the interior of the turbine housing.

In addition, as shown in FIG. 5, sheet-metal-made plates (reinforcing plates) 45 and 46, which are press molded so as to extend along the curved shape of the outer pipe 40, are respectively fixed to inner surfaces of the sheet-metal-made first outer-pipe divided body 41 and the sheet-metal-made second outer-pipe divided body 42 forming the outer pipe 40 by welding at one or more spots (by spot welding).

As shown in FIGS. 2 and 4, a front-circumferential-edge-side end portion 21a of the sheet-metal-made first inner-pipe divided body 21 of the inner pipe 20 is fixed to an inner circumferential surface 11b of the center flange 11 by being welded (the welded portion is shown by the reference sign E). In addition, respective front-circumferential-edge-side end portions 41c and 42c of the sheet-metal-made first outer pipe divided body 41 and the sheet-metal-made second outer pipe divided body 42 forming the outer pipe 40 are fixed to an outer circumferential surface 11c of the center flange 11 by being welded (welded portions are shown by the reference sign E). In the above, a plurality of screw holes 11d for attaching bolts are formed in the center flange 11 at equal intervals.

As shown in FIG. 4, the exhaust-air-inlet-side flange 12 is formed so as to have a substantially annular shape, and its opening portion 12a forms the inlet of the exhaust gas B. A recessed portion 12c having the stepped-annular shape is formed at the inner side of the top side of an outer circumferential surface 12b of the exhaust-air-inlet-side flange 12, and a stepped portion 12e is integrally formed on an intermediate part of an inner circumferential surface 12d of the exhaust-air-inlet-side flange 12 so as to protrude radially inward. A lower end portion 21c side of the sheet-metal-made first inner-pipe divided body 21 and a lower end portion 22c side of the sheet-metal-made second inner-pipe divided body 22 of the inner pipe 20 are each formed to have a semi-arc curved shape extending along the stepped portion 12e and loosely fitted so as to be freely extendable/contractable by forming an opening portion (space) 25 with the stepped portion 12e. In other words, the inner pipe 20 is provided so as to be slidable with respect to the exhaust-air-inlet-side flange 12 in the space 25 formed between the inner pipe 20 and the exhaust-air-inlet-side flange 12.

In addition, as shown in FIGS. 2 to 4, lower end portions 41e and 42e sides of the sheet-metal-made first outer-pipe divided body 41 and the sheet-metal-made second outer-pipe divided body 42 forming the outer pipe 40 are respectively formed to have the semi-arc curved shape extending along the recessed portion 12c of the exhaust-air-inlet-side flange 12 and fixed to the upper side of the outer circumferential surface 12b by being welded (the welded portion is shown by the reference sign E) in a state in which both are fitted into the recessed portion 12c.

Furthermore, as shown in FIGS. 1 to 4, at a position on the sheet-metal-made second outer-pipe divided body 42 of the outer pipe 40 on the opposite side from the opening portion 12a of the exhaust-air-inlet-side flange 12 serving as the inlet of the exhaust gas B, a cylinder-shaped boss (fluid supply/discharge port) 51 is fixed by being welded (a welded portion is shown by a reference sign E). An opening 51a of the cylinder-shaped boss 51 is formed to have a size capable of allowing a washing fluid to pass through and is formed so as to be closed by a plug (closing member) 52. In addition, the opening 51a is configured so as to be positioned directly above the spiral-shaped exhaust gas flow path K when the turbine housing 10 is placed such that the exhaust-air-inlet-side flange 12 faces down. Furthermore, the opening 51a is configured so as to be positioned directly above the scroll shape of the spiral-shaped exhaust gas flow path K when the turbine housing 10 is placed such that the exhaust-air-inlet-side flange 12 faces down (see FIGS. 2, 4, and so forth). With the above-described configuration, the washing fluid that has been supplied and introduced from the opening 51a washes the interior of the turbine housing 10 by being distributed to the left and right in FIG. 2 at the apex portion of the scroll shape. Therefore, the opening 51a may not necessarily be positioned directly above an abutting portion between the first inner-pipe divided body 21 and the second inner-pipe divided body 22. In the above, a communication hole 53 that communicates with the opening 51a of the boss 51 is formed at the position of the first outer-pipe divided body 41 facing the cylinder-shaped boss 51. In addition, a plurality of screw holes (not shown) for attaching bolts are formed in the exhaust-air-inlet-side flange 12 at equal intervals.

Furthermore, as shown in FIGS. 3 and 4, the exhaust-air-outlet-side flange 13 is formed to have a substantially rectangular plate shape, and a circular opening portion 13a forms the outlet of the exhaust gas B at its center. A rear-side end portion 32 of the exhaust tube 30 and respective rear-circumferential-edge side end portions 41d and 42d of the sheet-metal-made first outer pipe divided body 41 and the sheet-metal-made second outer pipe divided body 42 forming the outer pipe 40 are fixed to an inner circumferential surface 13b of the exhaust-air-outlet-side flange 13 by being welded (the welded portion is shown by the reference sign E). In the above, screw holes 13d for attaching bolts are respectively formed on corner portions of the exhaust-air-outlet-side flange 13.

The outer pipe 40 formed of the first outer-pipe divided body 41 and the second outer-pipe divided body 42 is welded to the center flange 11 over the entire circumference thereof, welded to the exhaust-air-inlet-side flange 12 over the entire circumference thereof, and welded to the exhaust-air-outlet-side flange 13 over the entire circumference thereof. In the above, it suffices that the outer pipe 40 is welded to the respective flanges such that the inner pipe 20 is sealed, and welding points to the respective flanges may appropriately be selected from their outer circumferences or inner circumferences.

The turbine housing 10 that is assembled from a plurality of parts such as the center flange 11, respective flanges 12 and 13, the inner pipe 20, and the outer pipe 40, each having the configuration as described above, is subjected to, in a subsequent manufacturing process, operations, such as a cutting machining processing and a washing, of respective components, and thereby, a finished product is provided.

Figure 8:
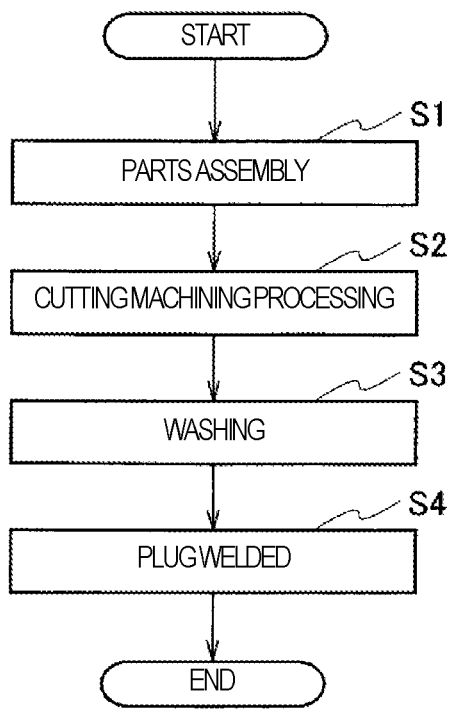
FIG. 8 is a flowchart showing a manufacturing step of the turbine housing.
Figure 9:
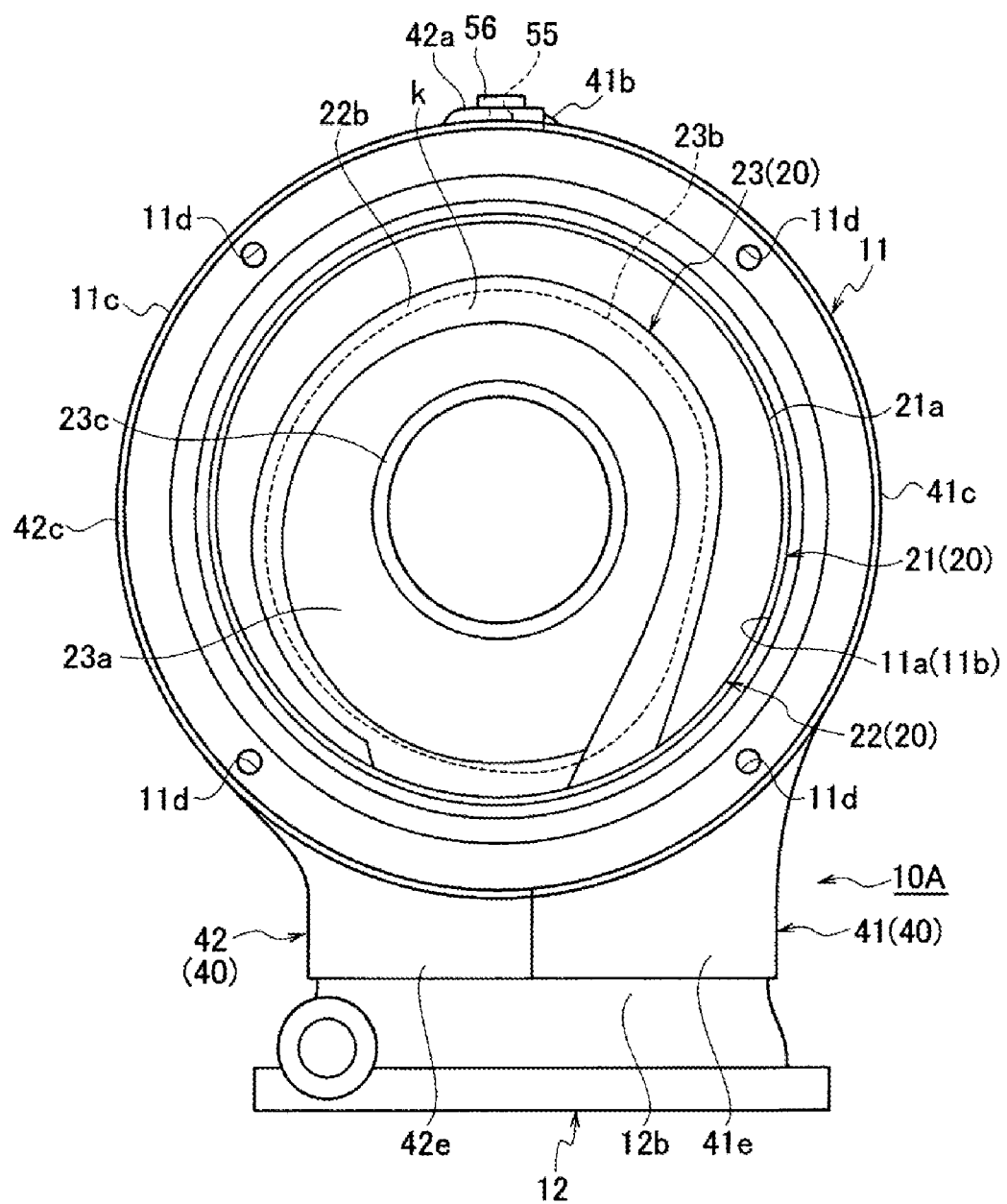
FIG. 9 is a front view of the turbine housing of a second embodiment of the present invention used in the turbocharger.
Figure 10:
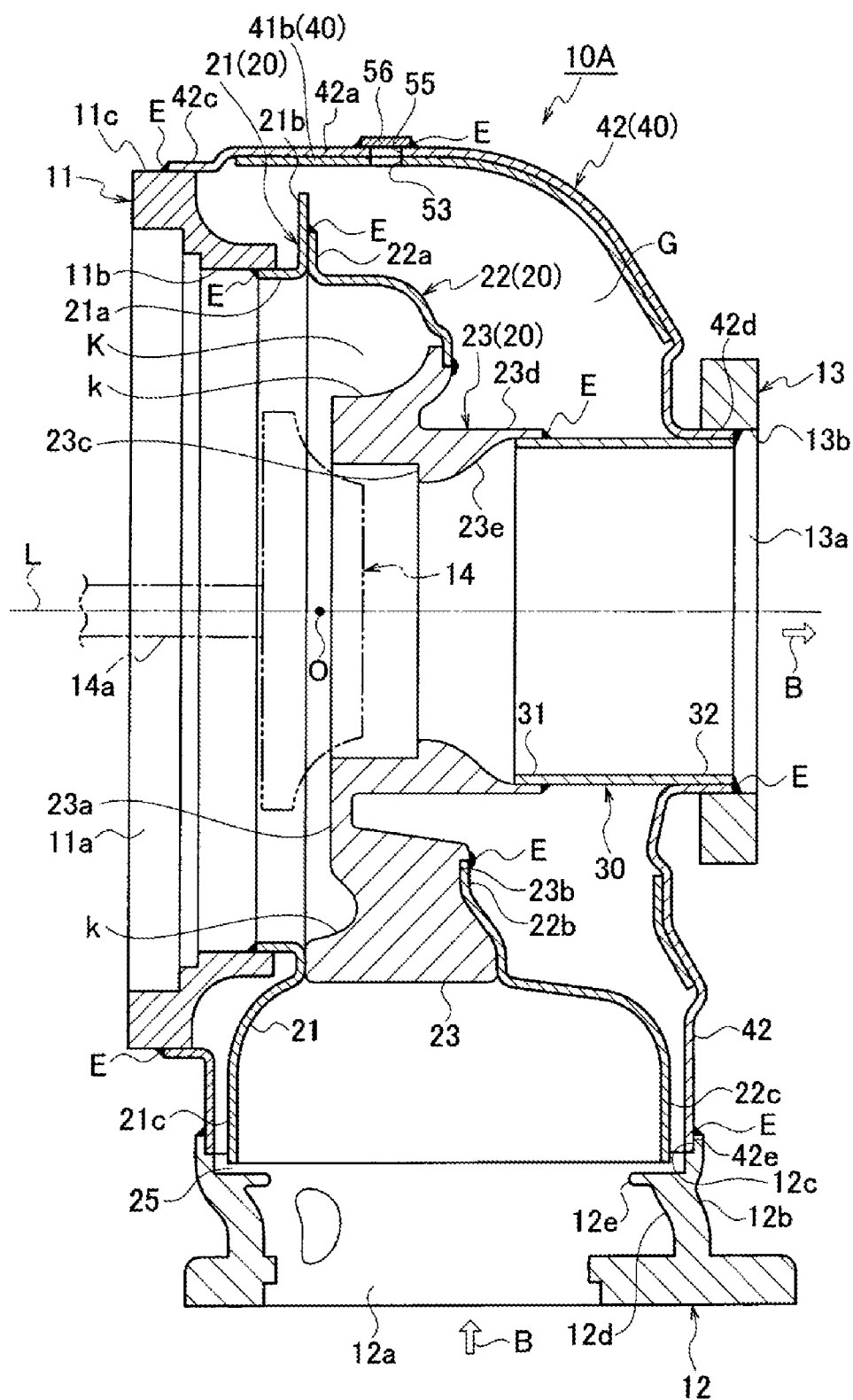
FIG. 10 is a sectional view of the turbine housing of the second embodiment.
Figure 11:
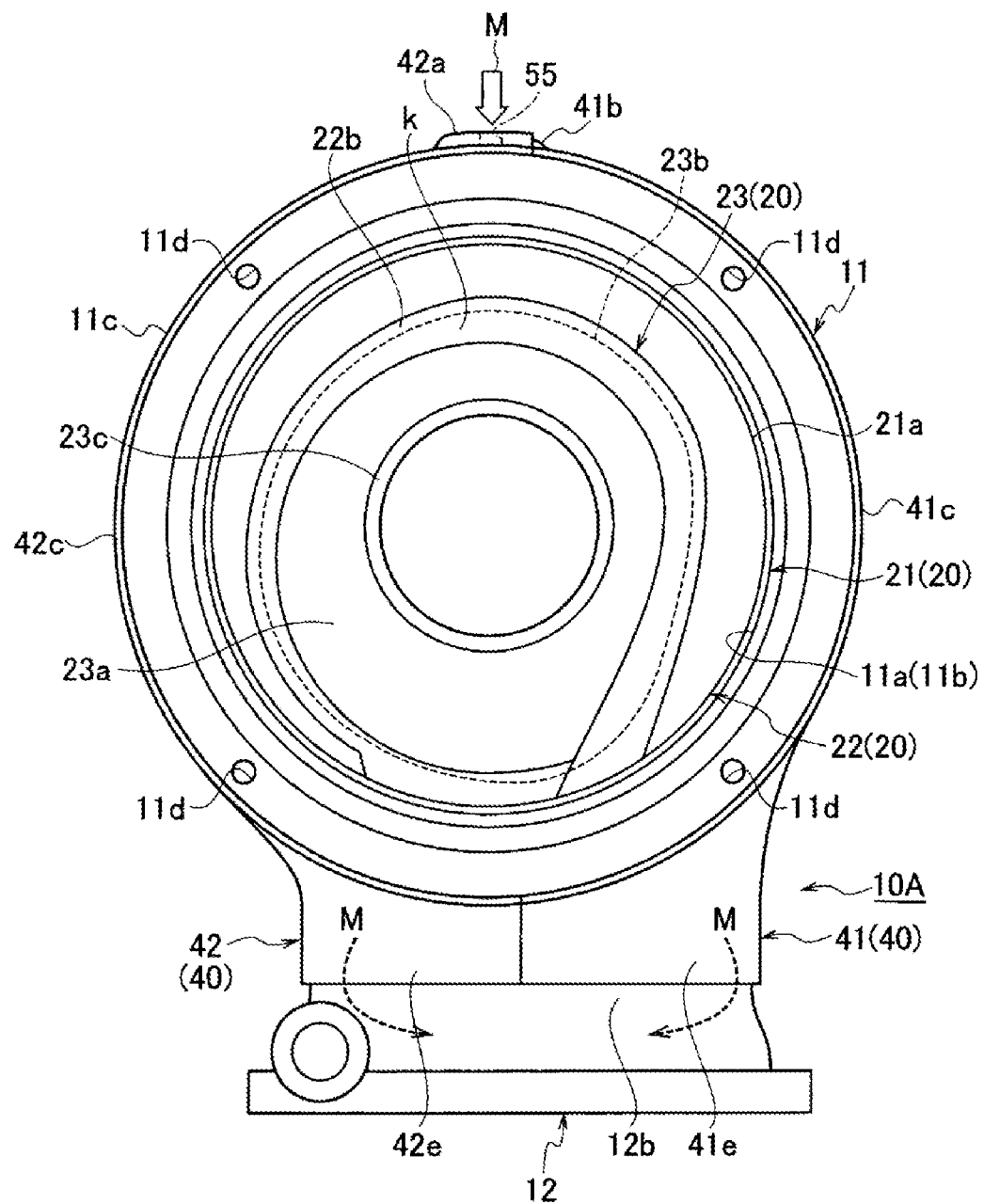
FIG. 11 is a front view showing the washing state of the interior of the turbine housing of the second embodiment.
Figure 12:
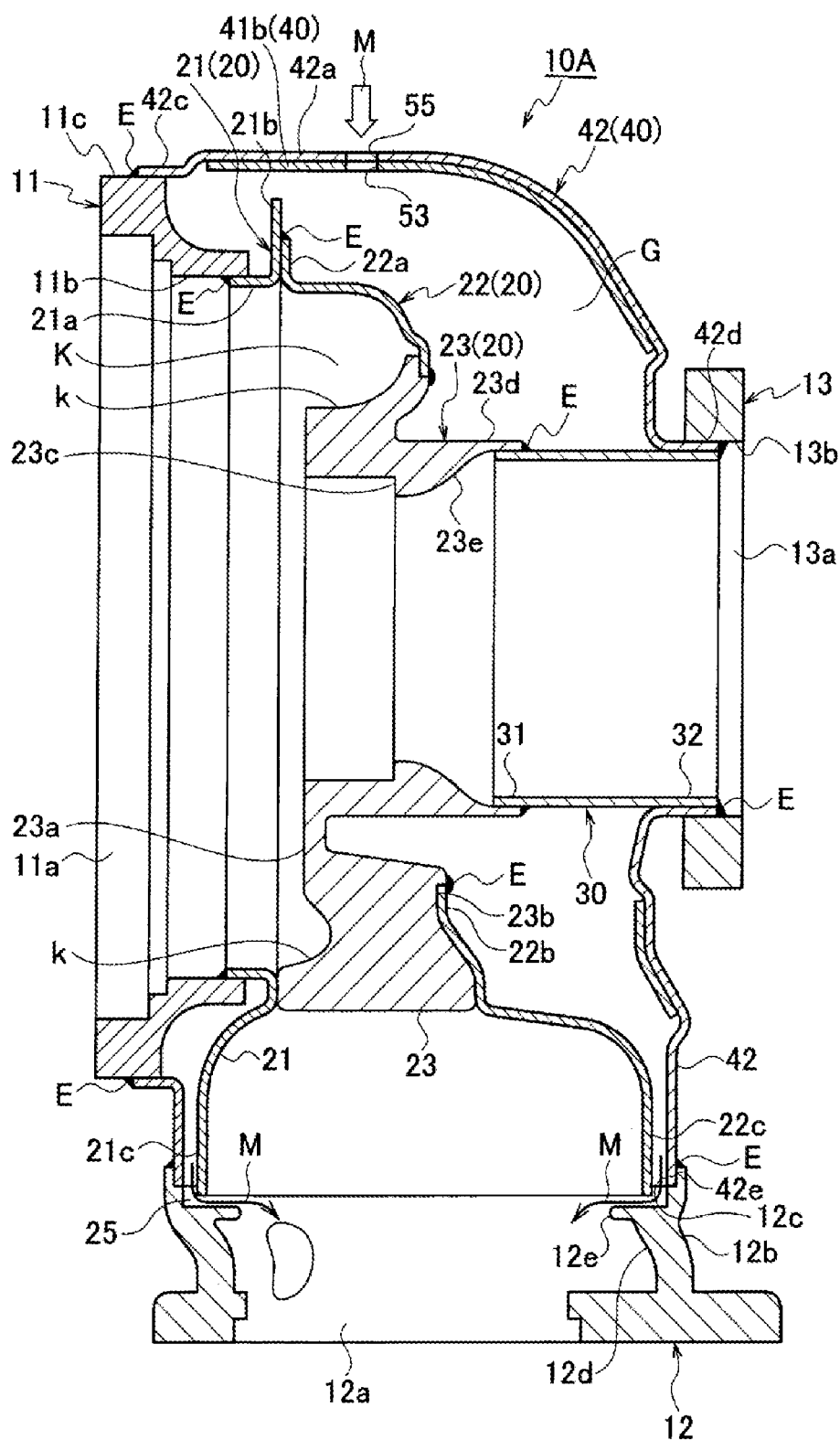
FIG. 12 is a sectional view showing the washing state of the interior of the turbine housing of the second embodiment.

Next, the manufacturing steps (cutting machining processing and washing) of the turbine housing 10 from the assembly to the finish will be described by following a flowchart shown in FIG. 8.

First, the first inner-pipe divided body 21 and the second inner-pipe divided body 22, which are made of sheet metals, and the cast-metal-made third inner-pipe divided body 23 forming the inner pipe 20 of the turbine housing 10 are assembled by being welded, and the first outer-pipe divided body 41 and the second outer-pipe divided body 42, which are made of sheet metals, forming the outer pipe 40 are assembled by being welded, and thereafter, thus assembled the inner pipe 20 and the outer pipe 40 are assembled with the center flange 11 and the respective flanges 12 and 13 by performing the welding (Step S1).

Next, the cutting machining processing is performed on the respective components such as the center flange 11, the respective flanges 12 and 13, the inner pipe 20, and the outer pipe 40 (Step S2).

After the cutting machining processing of the respective components has been finished, washing of the interior of the turbine housing 10 is performed by supplying high-pressure washing water (the washing fluid) M from the opening 51a of the cylinder-shaped boss 51 provided on the ceiling side of the outer pipe 40 (Step S3). By performing the washing, it is possible to wash off the extraneous matters such as the chips, etc. generated by the cutting machining processing with the high-pressure washing water M. In other words, it is possible to wash the extraneous matters such as chips, etc. generated at the time of the cutting machining processing of the respective components of the turbine housing 10 to the outside from the opening portion 25 that is provided between the exhaust-air-inlet-side flange 12 and the lower end portions 21c and 22c of the inner pipe 20 on the exhaust-air-inlet side. By doing so, because the extraneous matters such as chips, etc. generated by the cutting machining processing can be removed easily and reliably, it is possible to satisfy the strict standard for the amount of trapped extraneous matter in the interior.

The washing of the extraneous matter may be performed by placing the turbine housing 10 in a horizontal orientation, by supplying the high-pressure washing water M from the opening portion 25 that is provided between the exhaust-air-inlet-side flange 12 and the lower end portions 21c and 22c of the inner pipe 20 on the exhaust-air-inlet side, and by washing the extraneous matters such as chips, etc. generated at the time of the cutting machining processing of the respective components to the outside from the opening 51a of the boss 51 provided on the ceiling side of the outer pipe 40.

Finally, the plug 52 is fixed to the cylinder-shaped boss 51 serving as the supply/discharge port of the washing water M by being welded to close the opening 51a of the boss 51 (Step S4). By doing so, it is possible to produce the product of the turbine housing 10 that meets the strict standard for the amount of trapped extraneous matter in the interior easily, reliably, and at low cost.

In addition, after the washing is finished, because the cylinder-shaped boss 51 is closed with the plug 52 and the plug 52 is fixed by being welded, the exhaust gas B is prevented from leaking out from the outer pipe 40.

Furthermore, because a closed state of the plug 52 can be inspected by visually viewing the outer pipe 40, it is possible to easily confirm that the interior of the product has been washed and that the product meets the strict standard for the amount of trapped extraneous matter in the interior.

In the above, according to the first embodiment, although the plug is welded to the top end portion of the boss in order to close the opening of the boss, it may possible to fix the plug to the boss by forming a thread in the inner circumferential surface side of the boss, by fixing a bolt on the inner surface side of a ceiling of the plug, and by threading the bolt.

Next, a turbine housing 10A of a second embodiment of the present invention will be described with reference to FIGS. 9 to 12, and a turbine housing 10B of a third embodiment of the present invention will be described with reference to FIG. 13.

As shown in FIGS. 9 to 12, the second embodiment differs from the first embodiment in that a fluid inlet/outlet hole (a fluid supply/discharge port) 55 having a predetermined shape is formed at a position on the sheet-metal-made second outer-pipe divided body 42 of the outer pipe 40 on the opposite side from the opening portion 12a of the exhaust-air-inlet-side flange 12 serving as the inlet of the exhaust gas B, and the fluid inlet/outlet hole 55 is closed by a sheet-metal-made plate material (closing member) 56 having a predetermined shape. In the above, because other configurations are similar to those in the first embodiment, the same reference numerals are assigned to the same components, and a detailed description thereof will be omitted.

Figure 13:
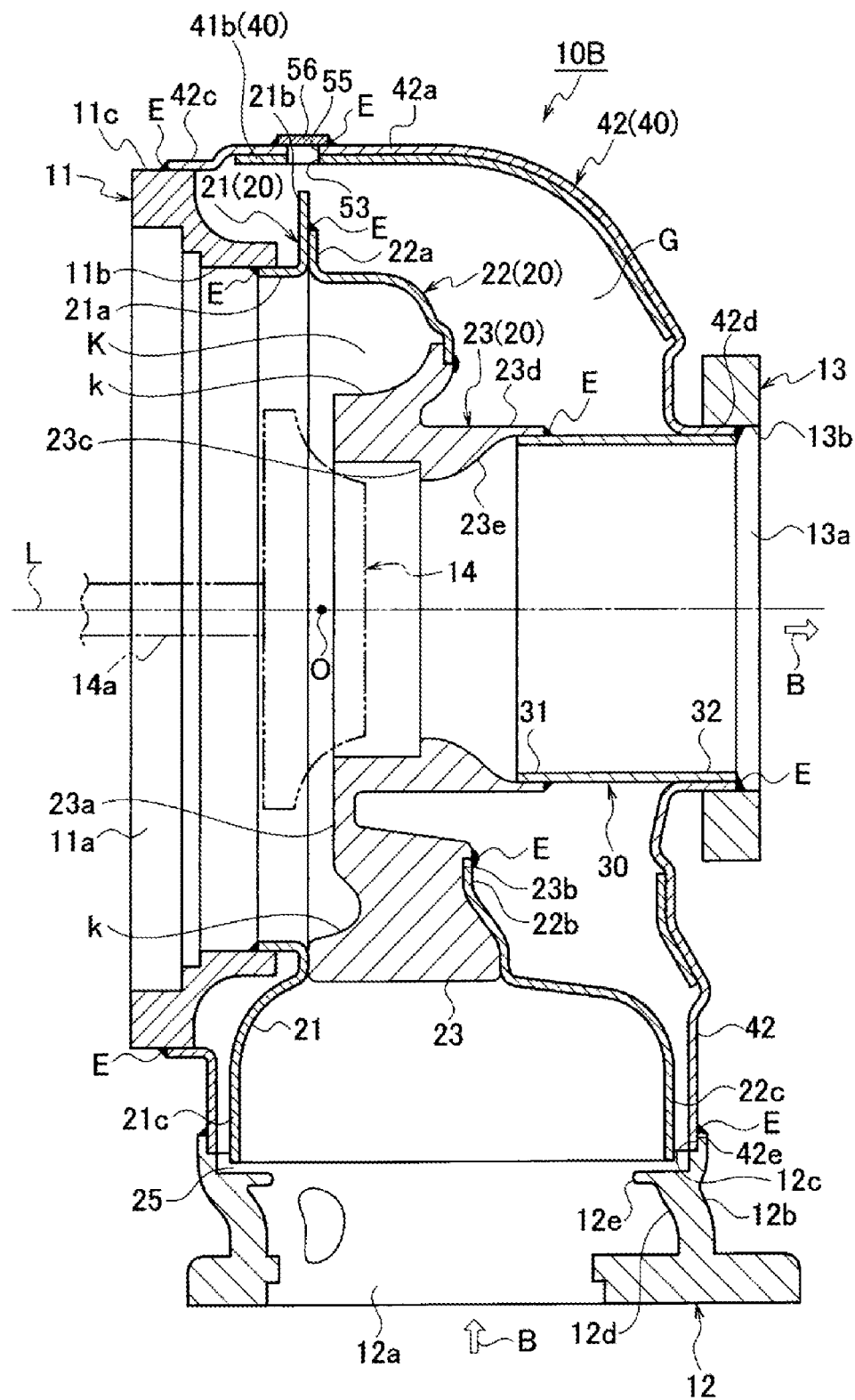
FIG. 13 is a sectional view of the turbine housing of a third embodiment of the present invention used in a turbocharger.

As shown in FIG. 13, the third embodiment differs from the first embodiment in that the fluid inlet/outlet hole (the fluid supply/discharge port) 55 having the predetermined shape is formed at the position of the sheet-metal-made second outer-pipe divided body 42 of the outer pipe 40 directly above the abutting portion between the rear-circumferential-edge-side end portion 21b and the front-circumferential-edge-side end portion 22a of two sheet-metal-made members, i.e. the first inner-pipe divided body 21 and the second inner-pipe divided body 22, and the fluid inlet/outlet hole 55 is closed by the sheet-metal-made plate material (closing member) 56 having the predetermined shape. In the above, because other configurations are similar to those in the first embodiment, the same reference numerals are assigned to the same components, and a detailed description thereof will be omitted.

Similarly to the first embodiment, also in the second embodiment and the third embodiment, the plurality of parts forming the turbine housing 10A, 10B are assembled and subjected to the cutting machining processing. Thereafter, the interior of the turbine housing 10A, 10B is washed by supplying the high-pressure washing water M from the fluid inlet/outlet hole 55 (in other words, the opening through which the washing fluid can pass through) that is provided on the ceiling side of the outer pipe 40 such that the extraneous matters such as chips, etc. generated at the time of the cutting machining processing of the respective components are washed out from the opening portion 25 that is provided between the exhaust-air-inlet-side flange 12 and the lower end portions 21c and 22c of the inner pipe 20 on the exhaust-air-inlet side. Alternatively, it is possible to place the turbine housing 10A, 10B in the horizontal orientation and to supply the high-pressure washing water M from the opening portion 25 that is provided between the exhaust-air-inlet-side flange 12 and the lower end portions 21c and 22c of the inner pipe 20 on the exhaust-air-inlet side such that the extraneous matters such as chips, etc. generated at the time of the cutting machining processing of the respective components are washed out from the fluid inlet/outlet hole 55 that is provided in the ceiling side of the outer pipe 40.

Similarly to the first embodiment, after the interior of the turbine housing 10A, 10B has been washed, the fluid inlet/outlet hole 55, which is the supply/discharge port of the washing water M, is then closed by fixing the sheet-metal-made plate material 56 to the fluid inlet/outlet hole 55 by welding, and thereby, it is possible to manufacture the turbine housing 10A, 10B that meets the strict standard for the amount of trapped extraneous matter in the interior easily, reliably, and at low cost.

In addition, after the washing is finished, because the fluid inlet/outlet hole 55 is closed with the sheet-metal-made plate material 56, the exhaust gas B is prevented from leaking out from the outer pipe 40. Furthermore, because the closed state of the sheet-metal-made plate material 56 can be inspected by visually viewing the outer pipe 40, it is possible to easily confirm that the interior of the product has been washed and that the product meets the strict standard for the amount of trapped extraneous matter in the interior.

Especially, according to the third embodiment, it is possible to allow the abutting portion between the rear-circumferential-edge-side end portion 21b and the front-circumferential-edge-side end portion 22a of two sheet-metal-made members, i.e. the first inner-pipe divided body 21 and the second inner-pipe divided body 22 to have a function of distributing the washing fluid, and therefore, it is possible to thoroughly wash outer wall of the inner pipe 20. By providing the opening 51a so as to be positioned directly above the apex of the scroll shape in the spiral-shaped exhaust gas flow path K and directly above the abutting portion between the first inner-pipe divided body 21 and the second inner-pipe divided body 22, in addition to the function of distributing the washing fluid to the left and right directions in FIG. 2, a function of distributing the washing fluid to the directions orthogonal to the plane of FIG. 2 (the left and right directions in FIG. 13) can also be achieved, and therefore, it is possible to wash the interior of the turbine housing 10 more thoroughly.

In the above, according to each of the embodiments, although the washing water is used as a washing fluid, a gas, such as compressed air, etc., may be used as the washing fluid.

In summary, according to each of the embodiments, it is possible to provide the turbine housing from which the extraneous matter in the interior of the turbine housing can be removed by washing and the washing method of the turbine housing.

REFERENCE SIGNS LIST

10, 10A, 10B: turbine housing
12: exhaust-air-inlet-side flange
12a: opening portion (exhaust gas inlet)
13: exhaust-air-outlet-side flange
13a: opening portion (exhaust gas outlet)
14: turbine wheel
20: inner pipe (scroll portion)
21: sheet-metal-made first inner-pipe divided body (sheet-metal-made scroll member)
21c: lower end portion
22: sheet-metal-made second inner-pipe divided body (sheet-metal-made scroll member)
22c: lower end portion
23: cast-metal-made third inner-pipe divided body (scroll member made of cast metal, which is formed by casting as a material having higher heat resistance than material made of sheet metal)
25: opening portion (space)
40: outer pipe
41: sheet-metal-made first outer-pipe divided body
41e: lower end portion
42: sheet-metal-made second outer-pipe divided body
42e: lower end portion
51: cylinder-shaped boss (fluid supply/discharge port)
51a: opening
52: plug (closing member)
55: fluid inlet/outlet hole (fluid supply/discharge port)
56: sheet-metal-made plate material (closing member)
B: exhaust gas
K: spiral exhaust gas flow path
G: space
O: spiral center portion (center portion)
E: welded portion
M: washing water (the washing fluid)

The invention claimed is:

1. A turbine housing comprising:
an inner pipe forming a spiral-shaped exhaust gas flow path;
an exhaust-air-inlet-side flange forming an exhaust gas inlet to the inner pipe; and
an outer pipe configured to, together with the exhaust-air-inlet-side flange, cover and seal the inner pipe, wherein
the outer pipe has an opening and a closing member for closing the opening, the opening being configured such that the washing fluid can pass through, and
a space is formed between the inner pipe and the exhaust-air-inlet-side flange, the space being configured such that the washing fluid can pass through.

2. The turbine housing according to claim 1, wherein the opening is positioned directly above an apex of a scroll shape in the spiral-shaped exhaust gas flow path when the turbine housing is placed such that the exhaust-air-inlet-side flange faces downward.

3. The turbine housing according to claim 1, wherein the opening is positioned directly above the spiral-shaped exhaust gas flow path when the turbine housing is placed such that the exhaust-air-inlet-side flange faces downward.

4. The turbine housing according to claim 1, wherein the inner pipe includes two sheet-metal-made inner-pipe divided bodies, the sheet-metal-made inner-pipe divided bodies being in a state in which end portions of the sheet-metal-made inner-pipe divided bodies are mutually abutted, and
the opening faces the abutting portion of the inner-pipe divided body.

5. The turbine housing according to claim 1, wherein the inner pipe is provided slidably with respect to the exhaust-air-inlet-side flange in the space between the inner pipe and the exhaust-air-inlet-side flange.

6. A washing method of a turbine housing, the turbine housing being provided with a scroll portion forming a spiral-shaped exhaust gas flow path between an exhaust-air-inlet-side flange forming an exhaust gas inlet and an exhaust-air-outlet-side flange forming the exhaust gas outlet,
the scroll portion being formed of an inner pipe, the inner pipe being at least formed of sheet-metal-made inner-pipe divided bodies divided into a plurality of parts, and
the turbine housing having a double-shell structure with a space between the inner pipe and an outer pipe such that the exhaust gas is discharged via a turbine wheel to an exhaust air outlet side, the inner pipe being covered by the outer pipe formed of sheet-metal-made outer pipe divided bodies divided into a plurality of parts so as to form the space between the inner pipe and the outer pipe, wherein after the plurality of parts forming the turbine housing are assembled and subjected to processing, the washing fluid is supplied from one of a liquid supply/discharge port provided at a position facing the exhaust gas inlet of the outer pipe or the space provided between a lower end portion of the inner pipe on an exhaust-air-inlet side and the exhaust-air-inlet-side flange, and the washing fluid is allowed to flow out from other of the liquid supply/discharge port or the space together with extraneous matter generated during the processing.

* * * * *